(12) United States Patent
Lee et al.

(10) Patent No.: US 11,520,429 B2
(45) Date of Patent: Dec. 6, 2022

(54) THREE-DIMENSIONAL SENSING MODULE AND METHOD OF MANUFACTURING THE SAME AND ELECTRONIC APPARATUS

(71) Applicant: TPK Advanced Solutions Inc., Fujian (CN)

(72) Inventors: Lien Hsin Lee, Taipei (TW); Ren Hung Wang, Taichung (TW); Cai Jin Ye, Xiamen (CN); Wei Yi Lin, Taoyuan (TW); Tai Shih Cheng, Taipei (TW); Tsai Kuei Wei, Hsinchu County (TW); Chih Cheng Chuang, Zhubei (TW); Sun Po Lin, Hsinchu County (TW)

(73) Assignee: TPK Advanced Solutions Inc., Fujian (CN)

(*) Notice: Subject to any disclaimer, the term of this patent is extended or adjusted under 35 U.S.C. 154(b) by 13 days.

(21) Appl. No.: 17/011,108

(22) Filed: Sep. 3, 2020

(65) Prior Publication Data

US 2022/0066608 A1 Mar. 3, 2022

(51) Int. Cl.
*G06F 3/041* (2006.01)
*G01L 1/22* (2006.01)
*G01L 1/20* (2006.01)

(52) U.S. Cl.
CPC .......... *G06F 3/04146* (2019.05); *G01L 1/205* (2013.01); *G01L 1/2287* (2013.01); *G06F 2203/04103* (2013.01)

(58) Field of Classification Search
CPC ....... G06F 3/04146; G06F 2203/04103; G01L 1/205; G01L 1/2287
See application file for complete search history.

(56) References Cited

U.S. PATENT DOCUMENTS

| | | | |
|---|---|---|---|
| 2014/0307186 A1 | 10/2014 | Yun et al. | |
| 2017/0031491 A1 | 2/2017 | Bao et al. | |
| 2019/0196633 A1* | 6/2019 | Lin | G06F 3/044 |

FOREIGN PATENT DOCUMENTS

| | | | | |
|---|---|---|---|---|
| CN | 110703935 A | | 1/2020 | |
| KR | 10-2011-0120121 A | | 11/2011 | |
| KR | 20110120121 A | * | 11/2011 | G06F 3/044 |
| KR | 10-2019-0052403 A | | 5/2019 | |
| TW | 201905668 A | | 2/2019 | |
| TW | M605319 U | | 12/2020 | |
| WO | WO-2015025491 A | * | 2/2015 | B43L 1/008 |

* cited by examiner

*Primary Examiner* — Towfiq Elahi
(74) *Attorney, Agent, or Firm* — Cooper Legal Group, LLC (57) ABSTRACT

A three-dimensional sensing module includes a touch pressure sensing structure. The touch pressure sensing structure includes a first functional spacer layer, a first light-transmitting electrode layer coated on the first functional spacer layer, a second functional spacer layer coated on the first light-transmitting electrode layer, a second light-transmitting electrode layer coated on the second functional spacer layer, and a third functional spacer layer coated on the second light-transmitting electrode layer. Resistivities of the first, second, and third functional spacer layers are greater than resistivities of the first and second light-transmitting electrode layers.

19 Claims, 5 Drawing Sheets

THREE-DIMENSIONAL SENSING MODULE AND METHOD OF MANUFACTURING THE SAME AND ELECTRONIC APPARATUS

BACKGROUND

Technical Field

The present disclosure relates to a three-dimensional sensing module and a method of manufacturing the same and an electronic apparatus.

Description of Related Art

With the diversified development of touch modules, touch modules have been maturely applied to industrial electronics and consumer electronics products. Demand has progressed from determining the two-dimensional position (e.g., the X-axis direction and the Y-axis direction) of the touch point on the surface of the screen to also sensing the force parameter caused by the change of the force applied to the surface of the screen (e.g., the Z-axis direction). Even the application requirements for flexible panels will be inevitable.

However, the conventional technology proposed by the existing industry has the following problems in the pressure sensor mounted on the touch module: (1) the X-Y-Z three-axis electrodes cannot have flexible characteristics at the same time and cannot be used as a flexible assembly; and (2) only a partial area has the Z-axis sensing function.

Accordingly, how to provide a three-dimensional sensing module to solve the aforementioned problems has become an important issue to be solved by those in the industry.

SUMMARY

An aspect of the disclosure is to provide a three-dimensional sensing module that can efficiently solve the aforementioned problems.

According to an embodiment of the disclosure, a three-dimensional sensing module includes a touch pressure sensing structure. The touch pressure sensing structure includes a first functional spacer layer, a first light-transmitting electrode layer, a second functional spacer layer, a second light-transmitting electrode layer, and a third functional spacer layer. The first light-transmitting electrode layer is coated on the first functional spacer layer. The second functional spacer layer is coated on the first light-transmitting electrode layer. The second light-transmitting electrode layer is coated on the second functional spacer layer. The third functional spacer layer is coated on the second light-transmitting electrode layer. Resistivities of the first functional spacer layer, the second functional spacer layer, and the third functional spacer layer are greater than resistivities of the first light-transmitting electrode layer and the second light-transmitting electrode layer.

In an embodiment of the disclosure, the touch pressure sensing structure further includes a first flexible touch electrode layer and a second flexible touch electrode layer. The first functional spacer layer is coated on the first flexible touch electrode layer. The second flexible touch electrode layer is coated on the third functional spacer layer. The three-dimensional sensing module further includes a flexible cover plate disposed on the second flexible touch electrode layer.

In an embodiment of the disclosure, the three-dimensional sensing module further includes a controller configured to detect a touch position signal and a pressure sensing signal through the first flexible touch electrode layer and the second flexible touch electrode layer.

In an embodiment of the disclosure, at least one of the first flexible touch electrode layer, the first light-transmitting electrode layer, the second light-transmitting electrode layer, or the second flexible touch electrode layer is a silver nanowire electrode layer.

In an embodiment of the disclosure, resistivities of the first flexible touch electrode layer and the second flexible touch electrode layer range from 1 Ops to 150 Ops. The resistivities of the first light-transmitting electrode layer and the second light-transmitting electrode layer range from 150 Ops to 500 Ops. The resistivity of the second functional spacer layer ranges from 500 Ops to 1000 Ops. The resistivities of the first functional spacer layer and the third functional spacer layer range from 800 Ops to 1200 Ops.

In an embodiment of the disclosure, thicknesses of the first functional spacer layer and the third functional spacer layer are substantially the same.

In an embodiment of the disclosure, a thickness of the second functional spacer layer is smaller than the thickness of at least one of the first functional spacer layer or the third functional spacer layer.

In an embodiment of the disclosure, the thickness of the second functional spacer layer ranges from 30 nm to 100 nm. The thicknesses of the first functional spacer layer and the third functional spacer layer range from 400 nm to 1200 nm.

In an embodiment of the disclosure, each of the first light-transmitting electrode layer and the second light-transmitting electrode layer includes a plurality of electrode blocks spaced apart from each other.

In an embodiment of the disclosure, at least one of the first functional spacer layer, the second functional spacer layer, or the third functional spacer layer is a substrate layer doped with a low-concentration of silver nanowires.

According to an embodiment of the disclosure, an electronic apparatus includes the three-dimensional sensing module and a display module. The display module is disposed under the three-dimensional sensing module.

According to an embodiment of the disclosure, a method of manufacturing a three-dimensional sensing module includes: forming a first flexible touch electrode layer; coating a light-transmitting force-sensitive composite layer on the first flexible touch electrode layer, in which the light-transmitting force-sensitive composite layer includes at least one light-transmitting electrode layer and at least one functional spacer layer, and a resistivity of the at least one light-transmitting electrode layer is smaller than a resistivity of the at least one functional spacer layer; and coating a second flexible touch electrode layer on the light-transmitting force-sensitive composite layer.

In an embodiment of the disclosure, the coating the light-transmitting force-sensitive composite layer includes: coating a first functional spacer layer on the first flexible touch electrode layer; coating a first light-transmitting electrode layer on the first functional spacer layer; coating a second functional spacer layer on the first light-transmitting electrode layer; coating a second light-transmitting electrode layer on the second functional spacer layer; and coating a third functional spacer layer on the second light-transmitting electrode layer.

Accordingly, in the three-dimensional sensing module of the present disclosure, the touch pressure sensing structure is formed by two flexible touch electrode layers and a light-transmitting force-sensitive composite layer stacked therebetween, so as to provide a two-dimensional touch position signal and a third-dimensional pressure sensing signal at the same time. The three-dimensional sensing module of the present disclosure can be simply completed by only multiple coating processes. Therefore, compared with the conventional complicated method of separately manufacturing the touch module and the display module and then gluing them, the manufacturing process of the three-dimensional sensing module of the present disclosure can completely eliminate the use of glue. As a result, the multi-layer gluing process and the thickness of the glue can be reduced, so that the three-dimensional sensing module of the present disclosure can realize a thin design.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
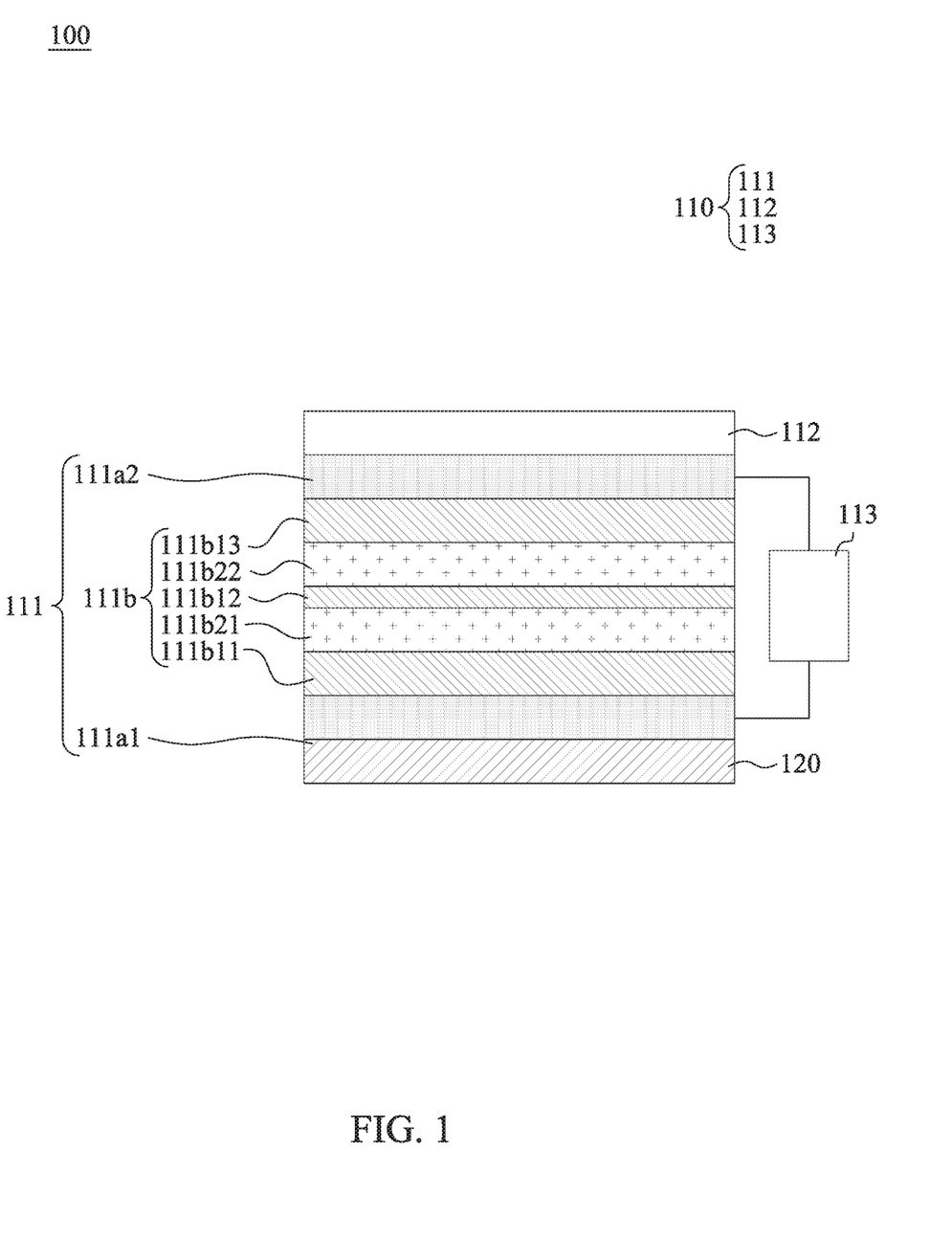
FIG. 1 is a schematic diagram of an electronic apparatus according to an embodiment of the disclosure.
Figure 2:
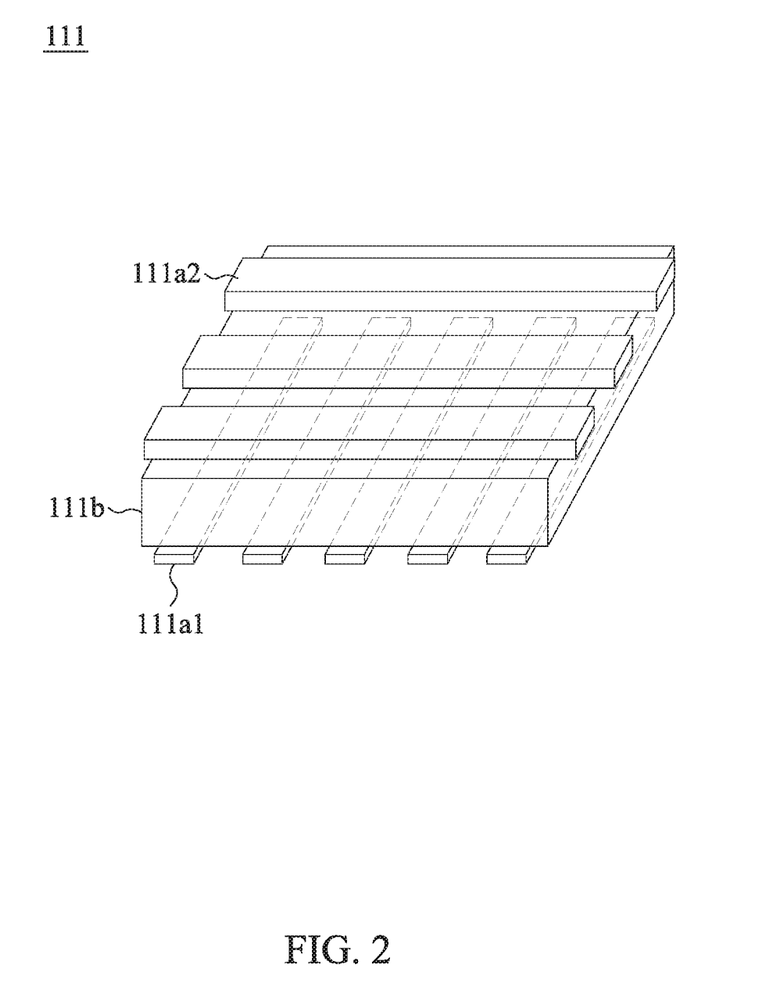
FIG. 2 is a partial view of some components of the electronic apparatus in FIG. 1.

Reference is made to FIGS. 1 and 2. FIG. 1 is a schematic diagram of an electronic apparatus 100 according to an embodiment of the disclosure. FIG. 2 is a partial view of some components of the electronic apparatus 100 in FIG. 1. As shown in FIGS. 1 and 2, the electronic apparatus 100 of the present embodiment is a touch display device as an example and includes a three-dimensional sensing module 110 and a display module 120. The display module 120 is disposed under the three-dimensional sensing module 110.

Specifically, the three-dimensional sensing module 110 includes a touch pressure sensing structure 111 and a flexible cover plate 112. The touch pressure sensing structure 111 includes a first flexible touch electrode layer 111a1, a second flexible touch electrode layer 111a2, and a light-transmitting force-sensitive composite layer 111b located between the first flexible touch electrode layer 111a1 and the second flexible touch electrode layer 111a2. The light-transmitting force-sensitive composite layer 111b includes a first functional spacer layer 111b11, a first light-transmitting electrode layer 111b21, a second functional spacer layer 111b12, a second light-transmitting electrode layer 111b22, and a third functional spacer layer 111b13. The first functional spacer layer 111b11 is coated on the first flexible touch electrode layer 111a1. The first light-transmitting electrode layer 111b21 is coated on the first functional spacer layer 111b11. The second functional spacer layer 111b12 is coated on the first light-transmitting electrode layer 111b21. The second light-transmitting electrode layer 111b22 is coated on the second functional spacer layer 111b12. The third functional spacer layer 111b13 is coated on the second light-transmitting electrode layer 111b22. Resistivities of the first functional spacer layer 111b11, the second functional spacer layer 111b12, and the third functional spacer layer 111b13 are greater than resistivities of the first light-transmitting electrode layer 111b21 and the second light-transmitting electrode layer 111b22. The second flexible touch electrode layer 111a2 is coated on the third functional spacer layer 111b13. The flexible cover plate 112 is disposed on the second flexible touch electrode layer 111a2.

In some embodiments, the material of the flexible cover plate 112 includes a flexible polymer material. For example, the flexible polymer material includes Colorless Polyimide (PI), but the present disclosure is not limited in this regard.

As shown in FIG. 1, the three-dimensional sensing module 110 further includes a controller 113. The controller 113 is electrically connected to the first flexible touch electrode layer 111a1 and the second flexible touch electrode layer 111a2. As shown in FIG. 2, both the first flexible touch electrode layer 111a1 and the second flexible touch electrode layer 111a2 are electrode layers after patterning, and the patterns are only for illustration and not intended to limit the scope of the present disclosure. The principle of the controller 113 to detect the touch position signal via the first flexible touch electrode layer 111a1 and the second flexible touch electrode layer 111a2 will not be described in detail here, and the related art can be referred to.

In some embodiments, at least one of the first flexible touch electrode layer 111a1, the first light-transmitting electrode layer 111b21, the second light-transmitting electrode layer 111b22, or the second flexible touch electrode layer 111a2 can be a silver nanowire electrode layer (SNW; also known as AgNW), a metal grid, or an indium tin oxide (ITO) electrode layer, but the present disclosure is not limited in this regard.

In some embodiments, the light-transmitting force-sensitive composite layer 111b has an optical transmittance greater than 85% and a haze less than 3%. In order to make the light-transmitting force-sensitive composite layer 111b meet the aforementioned requirements for optical transmittance and haze, in some embodiments, at least one of the first light-transmitting electrode layer 111b21 or the second light-transmitting electrode layer 111b22 is a silver nanowire electrode layer.

Figure 3A:
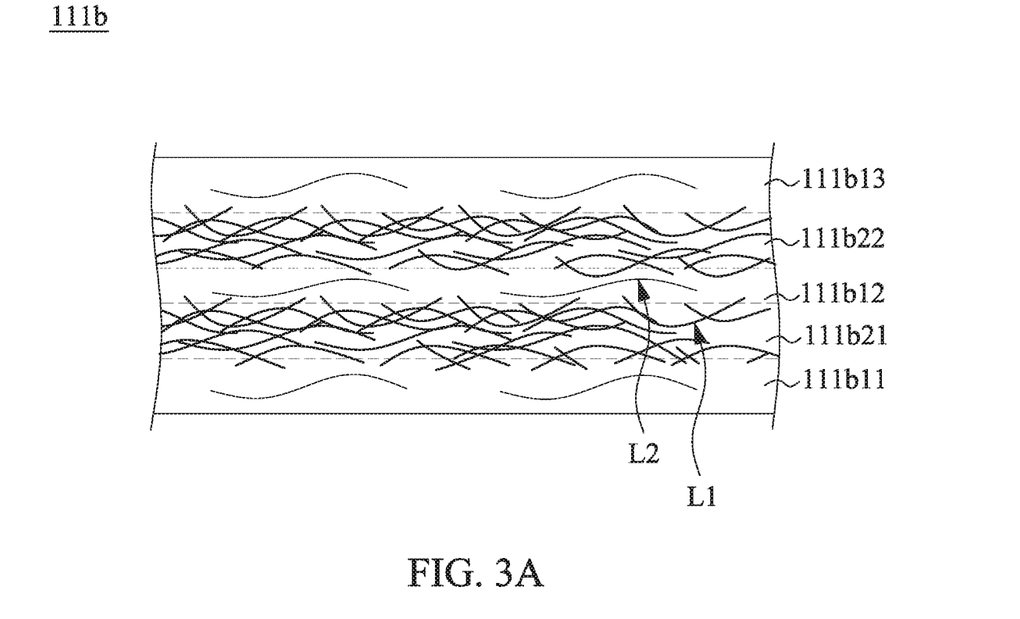
FIG. 3A is a partial enlarged view of a light-transmitting force-sensitive composite layer in FIG. 1 that is not pressed.

Reference is made to FIG. 3A. FIG. 3A is a partial enlarged view of a light-transmitting force-sensitive composite layer 111b in FIG. 1 that is not pressed. As shown in FIG. 3A, each of the first light-transmitting electrode layer 111b21 and the second light-transmitting electrode layer 111b22 includes a substrate and silver nanowires doped therein. The silver nanowires overlap each other in the substrate to form a conductive network. The substrate refers to a non-nanosilver material formed by a solution including the silver nanowires through processes such as coating, heating, and drying. The silver nanowires are distributed or embedded in the substrate and partially protrude out from the substrate. The substrate can protect the silver nanowires from the external environment, such as to protect against corrosion and abrasion. In some embodiments, the substrate is compressible.

In some embodiments, a wire length of the silver nanowires ranges from about 10 μm to about 300 μm. In some embodiments, a wire diameter (or a wire width) of the silver nanowires is less than about 500 nm. In some embodiments, the silver nanowires can be deformed forms such as other conductive metal nanowires or non-conductive nanowires coated with silver. The use of the silver nanowires to form the silver nanowire electrode layers has the following advantages compared with ITO: low price, simple process, good flexibility, resistance to bending, and etc.

In order to make the light-transmitting force-sensitive composite layer 111b meet the aforementioned requirements for optical transmittance and haze, in some embodiments, the first functional spacer layer 111b11, the second functional spacer layer 111b12, and the third functional spacer layer 111b13 can be light-transmitting coatings. In some embodiments, as shown in FIG. 3A, at least one of the first functional spacer layer 111b11, the second functional spacer layer 111b12, or the third functional spacer layer 111b13 can be a substrate layer doped with a low-concentration of silver nanowires. Specifically, each of the first functional spacer layer 111b11, the second functional spacer layer 111b12, and the third functional spacer layer 111b13 includes a substrate layer doped with a low-concentration of silver nanowires, so that resistivities of the first functional spacer layer 111b11, the second functional spacer layer 111b12, and the third functional spacer layer 111b13 are greater than resistivities of the first light-transmitting electrode layer 111b21 and the second light-transmitting electrode layer 111b22, and the first functional spacer layer 111b11, the second functional spacer layer 111b12, and the third functional spacer layer 111b13 have greater optical transmittances. In some embodiments, the substrates of the first functional spacer layer 111b11, the second functional spacer layer 111b12, and the third functional spacer layer 111b13 are identical to the substrates of the first light-transmitting electrode layer 111b21 and the second light-transmitting electrode layer 111b22, but the present disclosure is not limited in this regard.

In some embodiments, the resistivities of the first flexible touch electrode layer 111a1 and the second flexible touch electrode layer 111a2 range from 1 Ops (Ohm per Square) to 150 Ops (preferably 60 Ops), but the present disclosure is not limited in this regard. In some embodiments, the resistivities of the first light-transmitting electrode layer 111b21 and the second light-transmitting electrode layer 111b22 range from 150 Ops to 500 Ops (preferably 300 Ops), but the present disclosure is not limited in this regard. In some embodiments, the resistivity of the second functional spacer layer 111b12 ranges from 500 Ops to 1000 Ops (preferably 600 Ops), but the present disclosure is not limited in this regard. In some embodiments, the resistivities of the first functional spacer layer 111b11 and the third functional spacer layer 111b13 range from 800 Ops to 1200 Ops (preferably 800 Ops), but the present disclosure is not limited in this regard.

In practical applications, the resistivity can be measured to verify whether the concentration of the doped silver nanowires is high (e.g., the first light-transmitting electrode layer 111b21 and the second light-transmitting electrode layer 111b22) or low (e.g., the first functional spacer layer 111b11, the second functional spacer layer 111b12, and the third functional spacer layer 111b13). In addition, for the first functional spacer layer 111b11, the second functional spacer layer 111b12, and the third functional spacer layer 111b13 that are also doped with low-concentrations of silver nanowires, the difference in resistivity is related to the thickness.

Figure 3B:
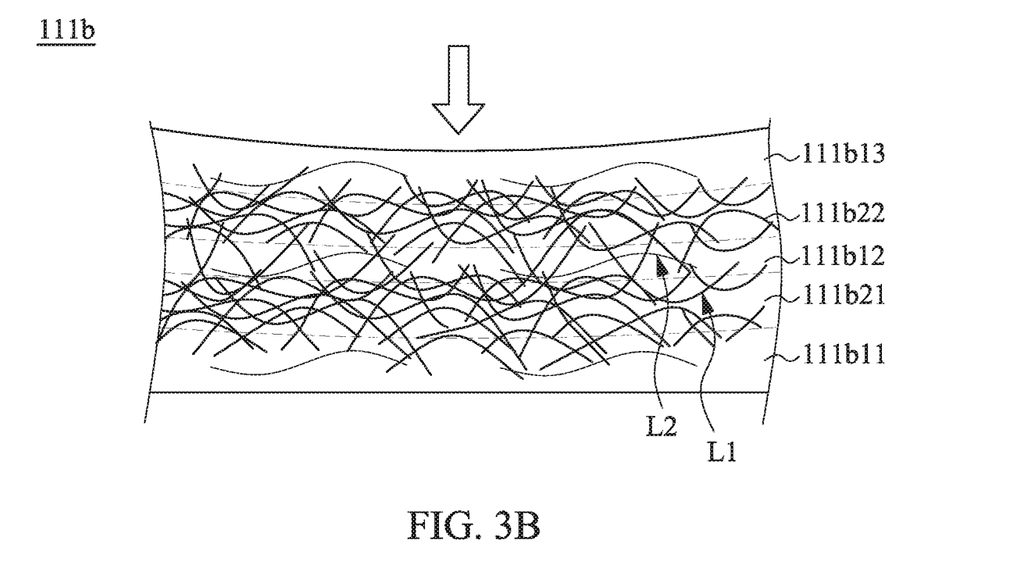
FIG. 3B is a partial enlarged view of the light-transmitting force-sensitive composite layer in FIG. 1 that is pressed.

Reference is made to FIG. 3B. FIG. 3B is a partial enlarged view of the light-transmitting force-sensitive composite layer 111b in FIG. 1 that is pressed. As shown in FIGS. 3A and 3B, since the first light-transmitting electrode layer 111b21 and the second light-transmitting electrode layer 111b22 are made of silver nanowires, when an external pressing force from the side of the flexible cover plate 112 is transmitted to the light-transmitting force-sensitive composite layer 111b, the first light-transmitting electrode layer 111b21 and the second light-transmitting electrode layer 111b22 will be compressed by the force to cause the silver nanowires inside to approach and pass through the first functional spacer layer 111b11, the second functional spacer layer 111b12, and the third functional spacer layer 111b13. When the number of contacting points increases, the overall conductivity of the light-transmitting force-sensitive composite layer 111b is improved (i.e., the resistivity decreases). For example, as shown in FIG. 3A, when the light-transmitting force-sensitive composite layer 111b has not been pressed, the silver nanowire L1 in the first light-transmitting electrode layer 111b21 and the silver nanowire L2 in the second functional spacer layer 111b12 do not contact each other. As shown in FIG. 3B, when the light-transmitting force-sensitive composite layer 111b is pressed, the silver nanowire L1 in the first light-transmitting electrode layer 111b21 will further penetrate into the second functional spacer layer 111b12 to contact the silver nanowire L2. Therefore, after detecting the change in the resistivity of the light-transmitting force-sensitive composite layer 111b through the first flexible touch electrode layer 111a1 and the second flexible touch electrode layer 111a2, the controller 113 can calculate the value of the external pressing force. For example, if the external pressing force is large, the resistivity of the light-transmitting force-sensitive composite layer 111b has a greater amount of change; on the contrary, if the external pressing force is small, the resistivity of the light-transmitting force-sensitive composite layer 111b has a small amount of change. Therefore, the value of the external pressing force can be calculated by the change in resistivity of the light-transmitting force-sensitive composite layer 111b.

In some embodiments, the controller 113 can simultaneously detect the touch position signal and the pressure sensing signal. In some other embodiments, the controller 113 can sequentially detect the touch position signal and the pressure sensing signal.

In some embodiments, a thickness of the second functional spacer layer 111b12 ranges from about 30 nm to about 100 nm (preferably from about 40 nm to about 80 nm).

Under the foregoing configuration, the resistivity between the light-transmitting force-sensitive composite layer 111b and the first flexible touch electrode layer 111a1 and the second flexible touch electrode layer 111a2 can be increased. Therefore, when the controller 113 detects the touch position signal, the capacitive sensing signal obtained through the first flexible touch electrode layer 111a1 and the second flexible touch electrode layer 111a2 is not easily interfered with by the light-transmitting force-sensitive composite layer 111b and is clearer.

Figure 4:
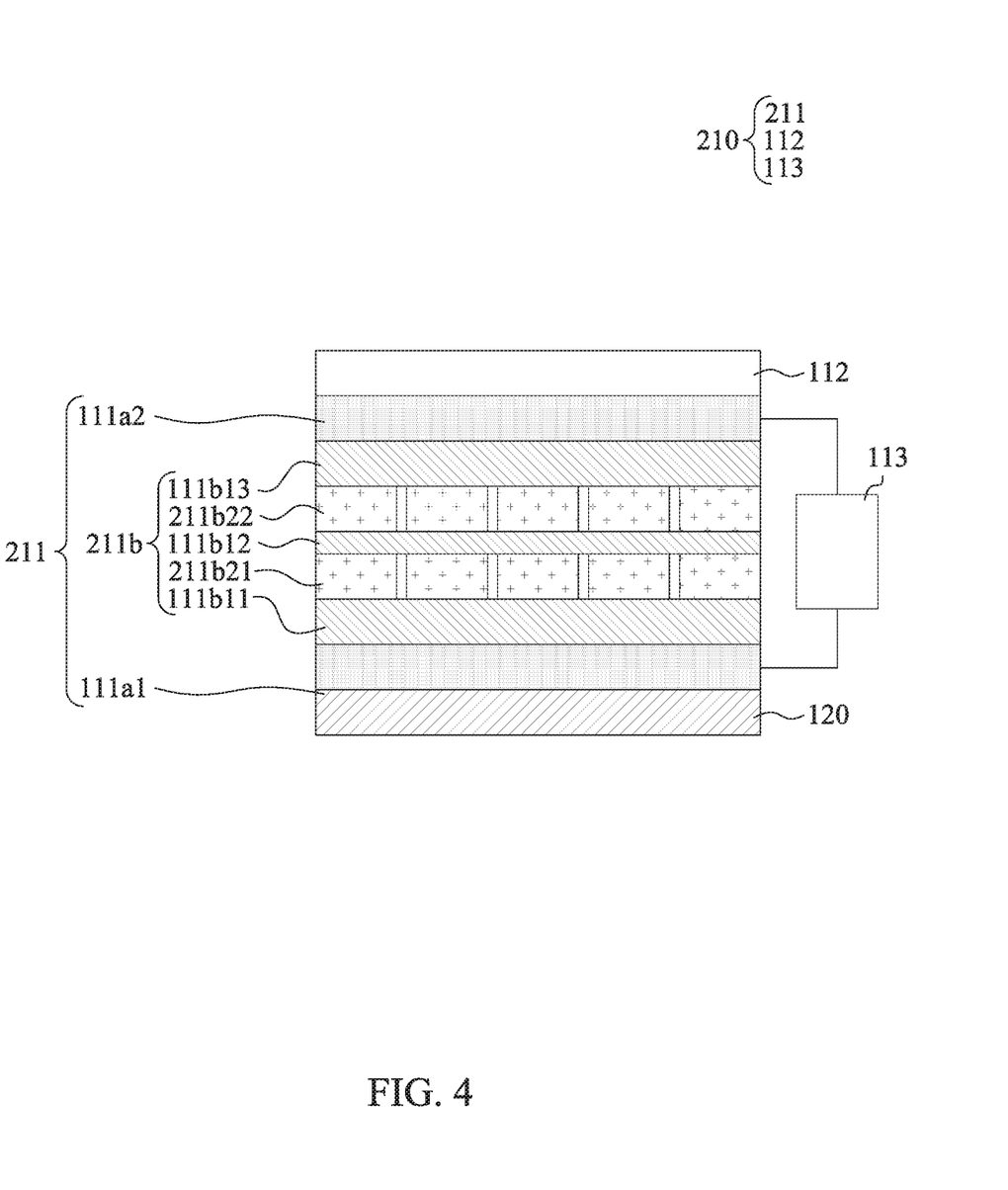
FIG. 4 is a schematic diagram of an electronic apparatus according to another embodiment of the disclosure.

It should be pointed out that in some embodiments, as shown in FIG. 1, each of the first light-transmitting electrode layer 111b21 and the second light-transmitting electrode layer 111b22 of the light-transmitting force-sensitive composite layer 111b is a monolithic structure and can provide a single-finger detection function, but the present disclosure is not limited in this regard. Reference is made to FIG. 4. FIG. 4 is a schematic diagram of an electronic apparatus 200 according to another embodiment of the disclosure.

As shown in FIG. 4, the electronic apparatus 200 includes a three-dimensional sensing module 210 and a display module 120. The three-dimensional sensing module 210 includes a touch pressure sensing structure 211 and a flexible cover plate 112. The touch pressure sensing structure 211 includes a first flexible touch electrode layer 111a1, a second flexible touch electrode layer 111a2, and a light-transmitting force-sensitive composite layer 211b located between the first flexible touch electrode layer 111a1 and the second flexible touch electrode layer 111a2. The light-transmitting force-sensitive composite layer 211b includes a first functional spacer layer 111b11, a first light-transmitting electrode layer 211b21, a second functional spacer layer 111b12, a second light-transmitting electrode layer 211b22, and a third functional spacer layer 111b13. Compared with the embodiment shown in FIG. 1, the electronic apparatus 200 of this embodiment is modified with respect to the first light-transmitting electrode layer 211b21 and the second light-transmitting electrode layer 211b22.

Specifically, each of the first light-transmitting electrode layer 211b21 and the second light-transmitting electrode layer 211b22 includes a plurality of electrode blocks. The electrode blocks are spaced apart from each other. During manufacturing, the first light-transmitting electrode layer 111b21 and the second light-transmitting electrode layer 111b22 shown in FIG. 1 can be patterned, so as to obtain the first light-transmitting electrode layer 211b21 and the second light-transmitting electrode layer 211b22 including pluralities of electrode blocks as illustrated in FIG. 4, respectively. With the separated electrode blocks, the controller 113 can achieve multi-finger detection.

Figure 5:
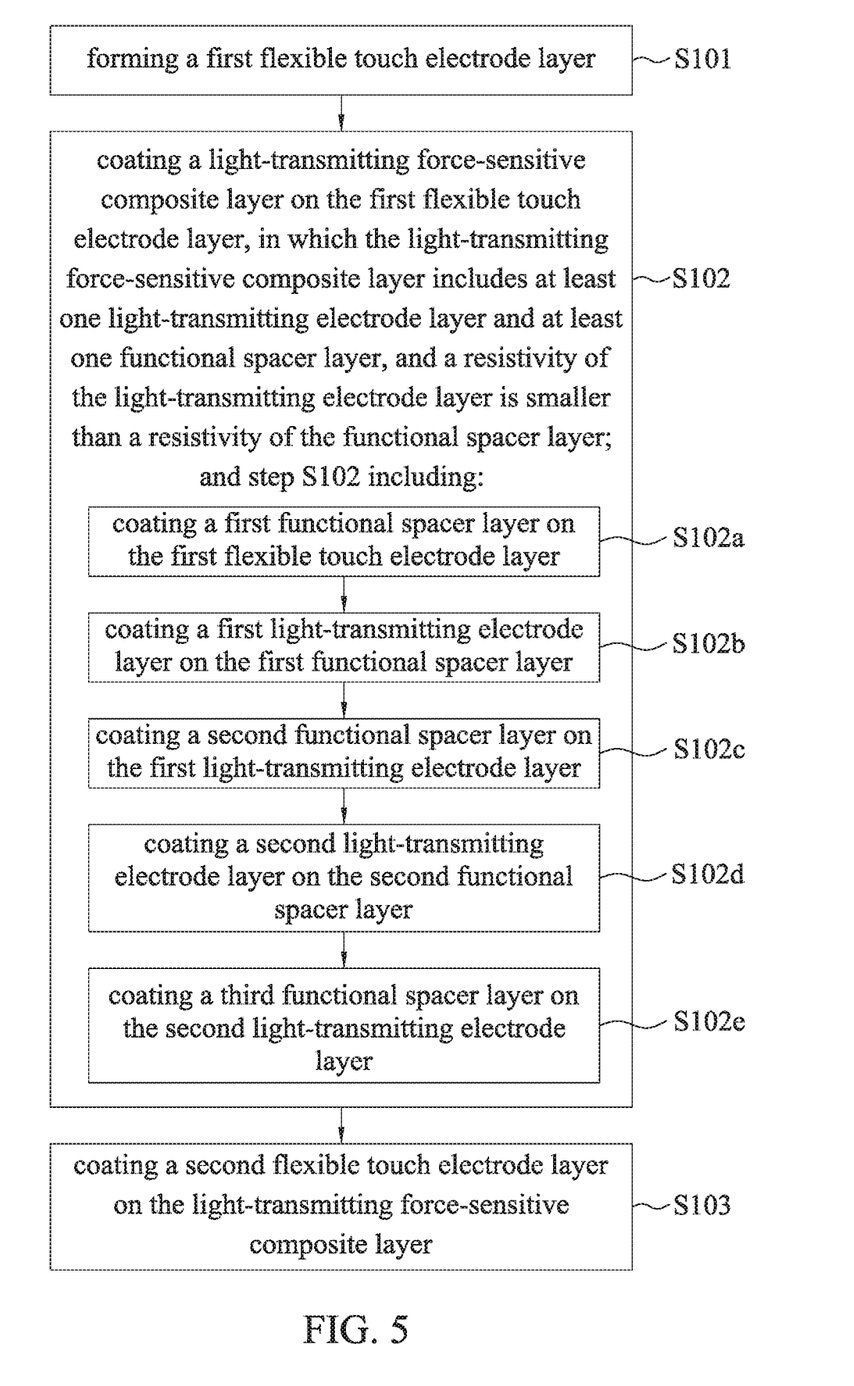
FIG. 5 is a flowchart of a method of manufacturing a three-dimensional sensing module according to an embodiment of the disclosure.

Reference is made to FIG. 5. FIG. 5 is a flowchart of a method of manufacturing a three-dimensional sensing module according to an embodiment of the disclosure. As shown in FIG. 5, a method of manufacturing a three-dimensional sensing module includes steps S101 to S103.

In step S101, a first flexible touch electrode layer is formed.

In step S102, a light-transmitting force-sensitive composite layer is coated on the first flexible touch electrode layer, in which the light-transmitting force-sensitive composite layer includes at least one light-transmitting electrode layer and at least one functional spacer layer, and a resistivity of the light-transmitting electrode layer is smaller than a resistivity of the functional spacer layer.

In step S103, a second flexible touch electrode layer is coated on the light-transmitting force-sensitive composite layer.

In some embodiments, step S102 includes steps S102a to S102e.

In step S102a, a first functional spacer layer is coated on the first flexible touch electrode layer.

In step S102b, a first light-transmitting electrode layer is coated on the first functional spacer layer.

In step S102c, a second functional spacer layer is coated on the first light-transmitting electrode layer.

In step S102d, a second light-transmitting electrode layer is coated on the second functional spacer layer.

In step S102e, a third functional spacer layer is coated on the second light-transmitting electrode layer.

In some embodiments, the coating processes in the foregoing steps include a spin coating process or a slit die coating, but the present disclosure is not limited in this regard.

In some embodiments, a step of patterning the first light-transmitting electrode layer can be added between step S102b and step S102c, and a step of patterning the second light-transmitting electrode layer can be added between step S102d and step S102e.

According to the foregoing recitations of the embodiments of the disclosure, it can be seen that in the three-dimensional sensing module of the present disclosure, the touch pressure sensing structure is formed by two flexible touch electrode layers and a light-transmitting force-sensitive composite layer stacked therebetween, so as to provide a two-dimensional touch position signal and a third-dimensional pressure sensing signal at the same time. The three-dimensional sensing module of the present disclosure can be simply completed by only multiple coating processes. Therefore, compared with the conventional complicated method of separately manufacturing the touch module and the display module and then gluing them, the manufacturing process of the three-dimensional sensing module of the present disclosure can completely eliminate the use of glue. As a result, the multi-layer gluing process and the thickness of the glue can be reduced, so that the three-dimensional sensing module of the present disclosure can realize a thin design.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A three-dimensional sensing module, comprising a touch pressure sensing structure, the touch pressure sensing structure comprising:
   a first flexible touch electrode layer;
   a first functional spacer layer coated on the first flexible touch electrode layer;
   a first light-transmitting electrode layer coated on the first functional spacer layer;
   a second functional spacer layer coated on the first light-transmitting electrode layer;
   a second light-transmitting electrode layer coated on the second functional spacer layer;
   a third functional spacer layer coated on the second light-transmitting electrode layer; and
   a second flexible touch electrode layer coated on the third functional spacer layer, wherein:
   resistivities of the first functional spacer layer, the second functional spacer layer, and the third functional spacer layer are greater than resistivities of the first light-transmitting electrode layer and the second light-transmitting electrode layer, resistivities of the first flexible touch electrode layer and the second flexible touch electrode layer range from 1 Ops to 150 Ops, the resistivities of the first light-transmitting electrode layer and the second light-transmitting electrode layer range from 150 Ops to 500 Ops, the resistivity of the second functional spacer layer ranges from 500 Ops to 1000 Ops, and the resistivities of the first functional spacer layer and the third functional spacer layer range from 800 Ops to 1200 Ops.

2. The three-dimensional sensing module of claim 1, wherein the three-dimensional sensing module further comprises a flexible cover plate disposed on the second flexible touch electrode layer.

3. The three-dimensional sensing module of claim 1, further comprising a controller configured to detect a touch position signal and a pressure sensing signal through the first flexible touch electrode layer and the second flexible touch electrode layer.

4. The three-dimensional sensing module of claim 1, wherein at least one of the first flexible touch electrode layer, the first light-transmitting electrode layer, the second light-transmitting electrode layer, or the second flexible touch electrode layer is a silver nanowire electrode layer.

5. The three-dimensional sensing module of claim 1, wherein thicknesses of the first functional spacer layer and the third functional spacer layer are substantially the same.

6. The three-dimensional sensing module of claim 5, wherein a thickness of the second functional spacer layer is smaller than the thickness of at least one of the first functional spacer layer or the third functional spacer layer.

7. The three-dimensional sensing module of claim 6, wherein the thickness of the second functional spacer layer ranges from 30 nm to 100 nm, and the thicknesses of the first functional spacer layer and the third functional spacer layer range from 400 nm to 1200 nm.

8. The three-dimensional sensing module of claim 1, wherein each of the first light-transmitting electrode layer and the second light-transmitting electrode layer comprises a plurality of electrode blocks spaced apart from each other.

9. The three-dimensional sensing module of claim 1, wherein at least one of the first functional spacer layer, the second functional spacer layer, or the third functional spacer layer is a substrate layer doped with a low-concentration of silver nanowires.

10. An electronic apparatus, comprising:
the three-dimensional sensing module of claim 1; and
a display module disposed under the three-dimensional sensing module.

11. A three-dimensional sensing module, comprising a touch pressure sensing structure, the touch pressure sensing structure comprising:
a first functional spacer layer;
a first light-transmitting electrode layer coated on the first functional spacer layer;
a second functional spacer layer coated on the first light-transmitting electrode layer;
a second light-transmitting electrode layer coated on the second functional spacer layer; and
a third functional spacer layer coated on the second light-transmitting electrode layer, wherein:
resistivities of the first functional spacer layer, the second functional spacer layer, and the third functional spacer layer are greater than resistivities of the first light-transmitting electrode layer and the second light-transmitting electrode layer,
thicknesses of the first functional spacer layer and the third functional spacer layer are substantially the same, and
a thickness of the second functional spacer layer is smaller than the thickness of at least one of the first functional spacer layer or the third functional spacer layer.

12. The three-dimensional sensing module of claim 11, wherein the touch pressure sensing structure further comprises:
a first flexible touch electrode layer, wherein the first functional spacer layer is coated on the first flexible touch electrode layer; and
a second flexible touch electrode layer coated on the third functional spacer layer.

13. The three-dimensional sensing module of claim 12, further comprising a controller configured to detect a touch position signal and a pressure sensing signal through the first flexible touch electrode layer and the second flexible touch electrode layer.

14. The three-dimensional sensing module of claim 12, wherein at least one of the first flexible touch electrode layer, the first light-transmitting electrode layer, the second light-transmitting electrode layer, or the second flexible touch electrode layer is a silver nanowire electrode layer.

15. The three-dimensional sensing module of claim 12, wherein the three-dimensional sensing module further comprises a flexible cover plate disposed on the second flexible touch electrode layer.

16. The three-dimensional sensing module of claim 11, wherein the thickness of the second functional spacer layer ranges from 30 nm to 100 nm, and the thicknesses of the first functional spacer layer and the third functional spacer layer range from 400 nm to 1200 nm.

17. The three-dimensional sensing module of claim 11, wherein each of the first light-transmitting electrode layer and the second light-transmitting electrode layer comprises a plurality of electrode blocks spaced apart from each other.

18. The three-dimensional sensing module of claim 11, wherein at least one of the first functional spacer layer, the second functional spacer layer, or the third functional spacer layer is a substrate layer doped with a low-concentration of silver nanowires.

19. An electronic apparatus, comprising:
the three-dimensional sensing module of claim 11; and
a display module disposed under the three-dimensional sensing module.

* * * * *